United States Patent [19]
Burton et al.

[11] Patent Number: 5,438,698
[45] Date of Patent: Aug. 1, 1995

[54] WEARABLE AUDIO RECEPTION DEVICE

[75] Inventors: Steven C. Burton; Richard A. Perilli, both of Sunnyvale; Kenneth T. Perilli, Encinitas, all of Calif.

[73] Assignee: Sweat Accessories, Inc., Sunnyvale, Calif.

[21] Appl. No.: 233,214

[22] Filed: Apr. 25, 1994

Related U.S. Application Data

[63] Continuation of Ser. No. 989,595, Dec. 14, 1992, abandoned.

[51] Int. Cl.$^6$ .................................................. H04B 1/08
[52] U.S. Cl. ................................... 455/351; 455/344; 455/348; 455/349; 455/269; 2/209.13
[58] Field of Search ............... 455/344, 347, 348, 349, 455/351, 100, 97, 269; 343/713, 742, 743, 873; 381/183, 187, 188; 2/422, 6.2, 209.13

[56] References Cited

U.S. PATENT DOCUMENTS

| | | | |
|---|---|---|---|
| 2,101,033 | 12/1937 | Mashbir et al. | 455/351 |
| 3,582,951 | 6/1971 | Altmayer | 343/718 |
| 4,070,553 | 1/1978 | Hass | 455/351 |
| 4,648,130 | 3/1987 | Kuznetz | 455/351 |
| 4,682,363 | 7/1987 | Goldfarb et al. | |
| 4,727,599 | 2/1988 | Rappaport et al. | |
| 4,729,132 | 3/1988 | Fierro | 2/171.1 |
| 4,754,285 | 6/1988 | Robitaille | |
| 4,789,656 | 9/1988 | Dickey | |
| 4,864,619 | 9/1989 | Spates | |
| 4,894,663 | 1/1990 | Urbish et al. | 455/351 |
| 5,034,995 | 7/1991 | Ciccone | 455/344 |
| 5,257,033 | 10/1993 | Roche | 343/742 |

*Primary Examiner*—Edward F. Urban
*Assistant Examiner*—Doris To
*Attorney, Agent, or Firm*—Thomas E. Schatzel

[57] ABSTRACT

A wearable audio reception device includes an elongated flexible enclosure removably attachable to an article of clothing and the radio in turn being removably attachable to the flexible enclosure.

10 Claims, 2 Drawing Sheets

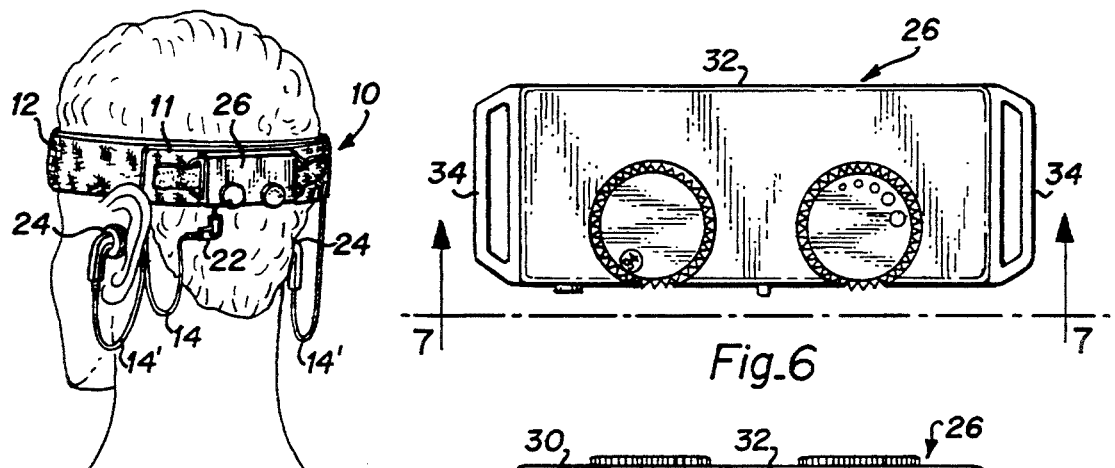
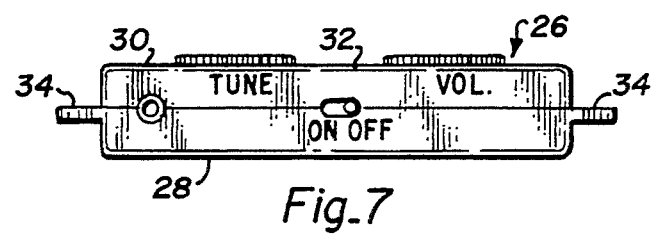
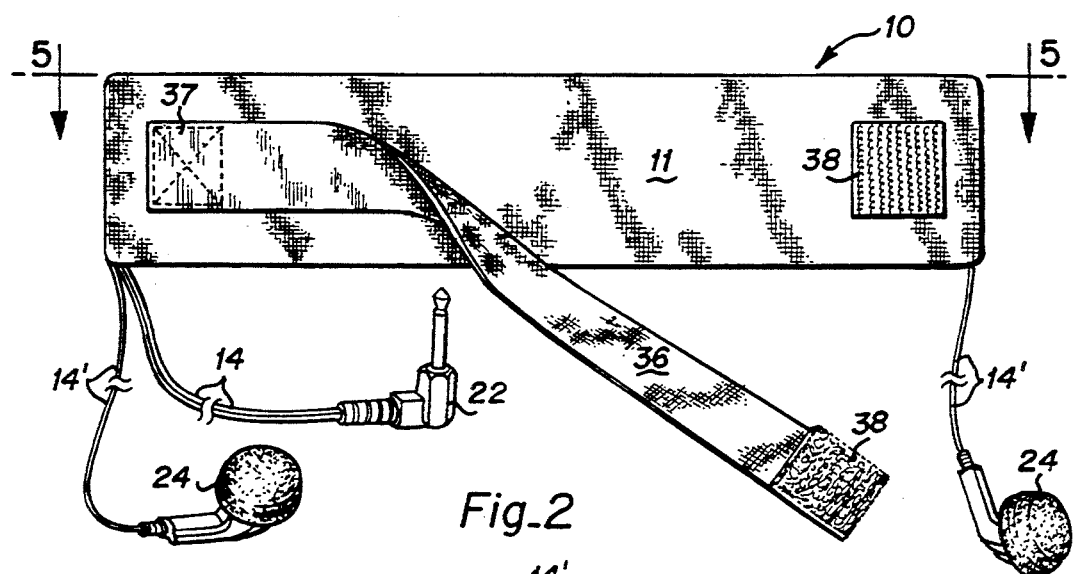
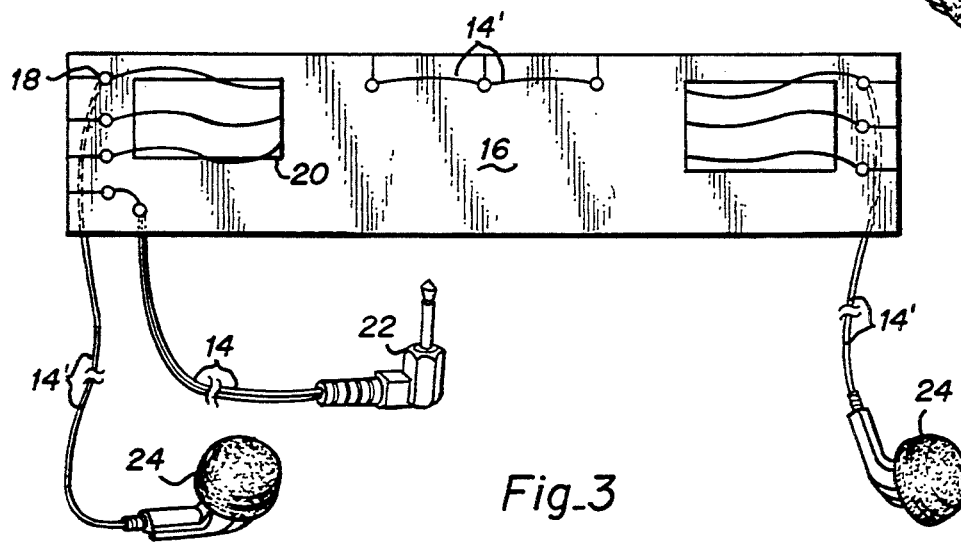

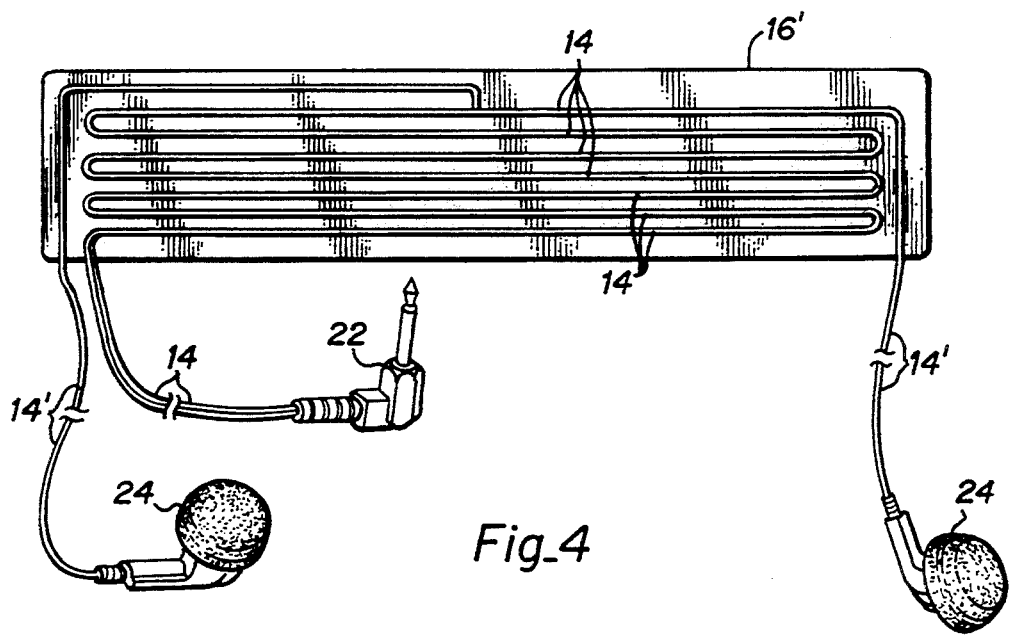
Fig_4
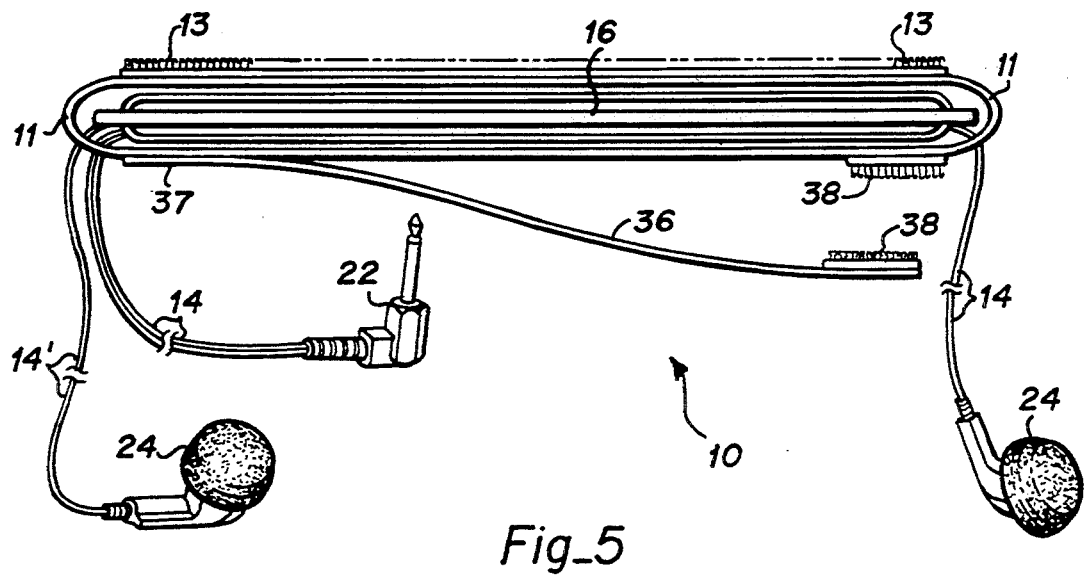
Fig_5

WEARABLE AUDIO RECEPTION DEVICE

This is a continuation of application Ser. No. 07/989,595, filed on Dec. 14, 1992, now abandoned.

FIELD OF THE INVENTION

The present invention relates to portable audio equipment, and more particularly, to a wearable audio reception device which is attachable to articles of clothing.

BACKGROUND OF THE INVENTION

Portable radios with earphones have become popular for use during many types of activities. For example, exercisers use portable radios with earphones to listen to radio broadcasts while exercising. Sports fans use portable radios at live games to listen to radio broadcasts of the game while viewing the game from the stands. Moreover, others use portable radios with earphones to listen to broadcasts privately and therefore, not disturb others. Portable radios are configured so that large headphones which substantially cover a user's ears are positioned adjacent to the user's ears by supporting them on a substantially rigid head mount. Smaller headphones are anchored inside the user's ear canals.

In portable radios with headphones, the antenna for the receiver is the long wires attaching the receiver to the headphones. Long antenna wires are required for quality reception of FM transmissions. Frequently, the long wires act as encumbrance to the user of the portable radio. For example, when the receiver is attached to the user's belt, suspended from the user's shoulder by a shoulder strap, or in the user's hand, the length and position of the antenna wires causes them to become tangled and unmanageable. Frequently, the wires are in the way of the user's hands and can become tangled with other articles carried by the user such as a purse or jacket.

Another type of portable radio with headphones is that having the receiver fixably attached to the headphone's substantially rigid head mount. In this arrangement, a rigid antenna is also attached to the head mount and typically projects upwards. While this type of portable radio avoids the problem of loose long antenna wires, it is a bulky and unbalanced arrangement, and therefore not suitable for use during activities involving substantial motion.

Other portable radio configurations include those which run an antenna through a headband so that it encircles a user's head. While this configuration avoids the problem of loose long antenna wires, the headband is rigid and therefore, uncomfortable. In this configuration, a headband made from a more comfortable non-rigid material such as fabric is unacceptable for many activities, such as exercising, because with the wires inside it, the headband cannot be washed.

Other portable radio configurations also include those which are attachable to a washable headband by clips. Because the radio is removable from the headband, the headband is washable. However, in these configurations, the earphone wires which double as antenna wires hang from the radio, drape down past the user's shoulders and therefore the wires are in the way of the user's hands and can become tangled with other articles carried by the user.

SUMMARY OF THE INVENTION

It is therefore an object of the present invention to provide a radio reception device where the antenna wires are positioned so that they do not interfere with the user's activities.

It is another object of this invention to provide a configuration wherein the user can removably attach the radio reception device to an article of clothing, such as a head band, so that the length of the earphone wires is minimized.

In accordance with the aforementioned and other objectives of the present invention, the present invention is a wearable radio reception device which is removably attachable to an article of clothing, such as a head band. The radio reception device includes means for supporting the antenna wire within a flexible enclosure so that the antenna wire is held in a compact arrangement. The radio reception device is attachable to an article of clothing by, for example, Velcro (a registered trademark), or clips. A radio, in turn, is attachable to the radio reception device. The radio housing has a handle on each extreme end so that the radio can be held in place on the radio reception device.

BRIEF DESCRIPTION OF THE DRAWINGS

FIG. 1 depicts the present invention removably attached to a headband;

FIG. 2 shows the flexible enclosure of the present invention;

FIG. 3 shows the antenna support of the present invention;

FIG. 4 shows a flexible printed circuit board having an antenna etched thereon;

FIG. 5 shows an edge view of the flexible enclosure of FIG. 2;

FIG. 6 shows a side view of a radio receiver housing of the present invention; and FIG. 7 shows a front view of the radio receiver shown in FIG. 6.

DETAILED DESCRIPTION OF THE INVENTION

Turning to FIG. 1, a first embodiment of the present invention is shown. A wearable audio reception device 10 includes a flexible enclosure 11 and a headband 12. The reason the wearable audio reception device 10 is removable, is so that the headband 12 can be separated from the flexible enclosure 11. Therefore, the headband 12 can be washed. The flexible enclosure 11 can in turn be removably attached to other types of clothing, such as a hat or a shirt collar. In the embodiment depicted in FIG. 1, the headband and the flexible enclosure 11 each have Velcro (trademark) on their meeting surfaces (not shown) to affix the flexible enclosure to the headband 12. Other means for attachment include snaps, buttons or clips (not shown). For example, in the case of a common baseball cap, the flexible enclosure 11 can be attached by clips to the adjusto-size band in the back of the cap, and therefore retro-fit any baseball cap.

The flexible enclosure 11 enclosing the long wires of a radio antenna is shown in FIG. 2. The flexible enclosure 11 houses an antenna wire 14 in a compact arrangement. The antenna is supported in its compact arrangement by, for example, a plastic holder 16 with holes 18 and guides 20 cutouts. FIG. 3 shows an antenna wire 14 woven onto plastic support 16 through holes 16 and guides 20, which secures the antenna in a compact arrangement. Antenna wire 14 is of sufficient length to effect radio reception, for example, 1 meter and is held in place by support 16 in the manner shown in FIG. 3. Other antenna wire configurations include zig-zag foldings or other suitable arrangements. In another embodiment, as shown in FIG. 4 means for supporting the antenna 14 is a flexible printed circuit board 16' with the antenna etched thereon.

The flexible enclosure 11 shown in FIGS. 1 and 2 also provides openings for the ends of antenna 14 and speaker wires so that it is connectable to the radio and the speakers. As depicted in FIG. 3, the antenna wire 14 at one end, is attachable to the radio receiver by plug 22. The antenna wire 14 is woven through the support, and then is split into separate speaker wires 14' so that, at the other end, both speaker wires 14' are connected to headphones 24. Smaller headphones which anchor inside the user's ear canals are preferable for use in accordance with the present invention because they need no additional positioning support. By arranging the long antenna wire on support 16 within the flexible enclosure 11, the antenna wires 14 and speaker wires 14' are confined to a small space and therefore, do not encumber the user.

FIG. 5 shows an edge view of the flexible enclosure 11 with wires 14 wrapped about support 16 and enclosed. On one side of the flexible enclosure 11 is Velcro 13 for attachment to an article of clothing. On the other side of the flexible enclosure 11 a threading strap 36 for attaching a radio thereon.

The enclosure 11, is flexible so that it contours the curves of a user's body as does clothing. It can be positioned against the curvature of the user's head on a headband or cap, and it can be straightened out when attaching it to the user's collar.

Turning to FIGS. 6 and 7, it is noted that typically, a portable radio 26 having battery access on its back side 28, and a front side 30. Therefore, in the present invention, it is preferable to provide means for removably attaching the radio receiver 26 to the flexible enclosure 11 so that the batteries can be changed.

To attach the radio to the flexible enclosure 11, the non-flexible radio receiver housing 32 has handles 34 on each extreme end. The handles 34 each have central opening to allow the radio 26 to be strapped to the flexible enclosure 11 by the strap 36. The strap 36 is anchored at one end at an anchor 37 and can be threaded through the openings of handles 34 to secure the radio 26. Elastic strap 36 is secured at its other terminal end by a Velcro anchor 38. This provides sufficient security so that the radio 26 will not fall off the flexible enclosure 11 during most activities. Handles 34 on radio housing 32 provide the ability to strap the radio 26 on other members. For example, a user could wear a fanny pack carrying regular speakers which are not headphone type speakers. In this way, the user is not necessarily required to listen to the music in private. Handles 34 allow the portable radio to be attachable to different articles. Furthermore, the wearable audio reception device of the present invention can also be used for reception of telephone or pager transmissions, television transmissions and other types of transmissions.

In placing the wearable audio reception device on a headband, for example, the portions of speaker wires 14' which are exposed can be made very short. Accordingly, the compact arrangement of the present invention within a flexible enclosure which is removably attachable to an article of clothing allows the user to partake in activities while listening to radio broadcast without restriction.

What is claimed is:

1. A wearable audio reception device comprising, in combination:

a flexible fabric article of clothing (12) for encircling about a head of a human-being and including a first frictionable receiving tab;

an elongated flexible enclosure (11) having a first and a second exterior surfaces in parallel to each other and forming an internal pocket between said first and second exterior surfaces, the enclosure overlapping a portion of the article of clothing, the enclosure having a second frictional receiving tab (13) about said first exterior surface of the enclosure for interface frictional, removable engagement with said first frictional receiving tab, a first fabric anchor secured to said second exterior surface about a first terminal end of the elongated enclosure and a second fabric anchor secured to said second exterior surface about a second terminal end of the elongated enclosure, a threaded strap (36) having a first end anchored to said first anchor and a fastener means about a second end to frictionally and removably attach to said second anchor;

an elongated radio receiver housing (26) having a radio receiver with a first and second handles (34, 36) about opposite terminal ends of the receiver housing (26), the receiver housing being positioned with said first handle adjacent to said first fabric anchor and said second handle adjacent said second fabric anchor and said threaded strap threaded through said first and second handles with said fastener means adhered to said second anchor and overlapping the article of clothing and the elongated flexible enclosure, the receiver housing including a receptacle for receiving a headphone plug; and a flexible wire embedded within said pocket of the flexible enclosure and with a first external end extending from said pocket and connected to said headphone plug for insertion in said receptacle of said radio receiver housing and a second end extending from said pocket and connected to a speaker for physically interfacing with said head of said human-being, whereby said speaker may be electrically connected to the radio receiver while physically positioned about said head of said human-being, and the elongated flexible enclosure may be separated from the flexible article of clothing when removed from said head;

whereby the flexible enclosure overlaps the flexible article of clothing and the radio receiver overlaps the enclosure with the enclosure being severable from and replaceable to the article of clothing and the radio receiver being severable from and replaceable to the enclosure.

2. The device of claim 1 wherein, the flexible article of clothing is a cloth headband.

3. The device of claim 1 wherein said flexible wire is a flexible antenna.

4. The device of claim 3 wherein, the flexible article of clothing is a cloth headband.

5. The device of claim 2 wherein, said speaker includes means for positioning within ears of said human-being.

6. The device of claim 5 wherein said flexible wire is a flexible antenna.

7. The device of claim 1 wherein,
the radio receiver housing has a front side surface and a back side surface extending intermediate said opposite terminal ends, said first and second handles each include a central opening with said threading strap extending from said first anchor through said central openings of said first and second handles about said back side surface of the radio receiver to said second anchor.

8. The device of claim 5 wherein,
the radio receiver housing has a front side surface and a back side surface extending intermediate said opposite terminal ends, said first second handles each include a central opening with said threading strap extending from said first anchor through said central openings of said first and second handles about said back side surface of the radio receiver to said second anchor.

9. The device of claim 8
wherein said flexible wire is a flexible antenna.

10. The device of claim 9 wherein,
the flexible antenna is etched into a flexible printed circuit board.

* * * * *